(12) United States Patent
Crowther et al.

(10) Patent No.: US 6,291,609 B1
(45) Date of Patent: Sep. 18, 2001

(54) HIGH TEMPERATURE OLEFIN POLYMERIZATION PROCESS

(75) Inventors: Donna J. Crowther, Baytown, TX (US); Bernard J. Folie, Rhode-Saint-Genese (BE); John F. Walzer, Jr., Seabrook, TX (US); Rinaldo S. Schiffino, Wilmington, DE (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 09/261,637

(22) Filed: Mar. 3, 1999

Related U.S. Application Data

(60) Provisional application No. 60/076,712, filed on Mar. 4, 1998, provisional application No. 60/087,445, filed on Jun. 1, 1998, provisional application No. 60/087,447, filed on Jun. 1, 1998, provisional application No. 60/076,841, filed on Mar. 4, 1998, and provisional application No. 60/087,446, filed on Jun. 1, 1998.

(51) Int. Cl.⁷ ....................................................... C08F 4/42
(52) U.S. Cl. ........................... 526/127; 526/158; 526/121; 526/124.9; 526/160; 526/943; 526/348; 502/152; 502/102; 502/104; 502/117
(58) Field of Search ..................................... 526/158, 121, 526/124.9, 127, 160, 943, 348; 502/152, 102, 104, 117

(56) References Cited

U.S. PATENT DOCUMENTS

| | | |
|---|---|---|
| 5,198,401 | 3/1993 | Turner et al. . |
| 5,296,433 | 3/1994 | Siedle et al. . |
| 5,324,800 | 6/1994 | Welborn et al. . |
| 5,408,017 | 4/1995 | Turner et al. . |
| 5,710,224 | 1/1998 | Alt et al. . |
| 5,856,256 | * 1/1999 | Marks et al. ........................ 502/152 |

FOREIGN PATENT DOCUMENTS

| | | |
|---|---|---|
| 2017190 | 11/1990 | (CA) . |
| 2133181 | 3/1995 | (CA) . |
| 0 284 708 A1 | 9/1987 | (EP) . |
| 0 284 708 B1 | 9/1987 | (EP) . |
| 0 277 004 A1 | 8/1988 | (EP) . |
| 0 316 155 A2 | 11/1988 | (EP) . |
| 0 399 348 A2 | 5/1990 | (EP) . |
| 0 407 870 A2 | 7/1990 | (EP) . |
| 0 516 018 A2 | 5/1992 | (EP) . |
| 0 612 769 A1 | 2/1994 | (EP) . |
| 0 612 768 | * 8/1994 | (EP) . |
| 0 612 768 A1 | 8/1994 | (EP) . |
| 0 645 401 A1 | 9/1994 | (EP) . |
| 0 666 267 A2 | 12/1994 | (EP) . |
| 0 824 113 A1 | 2/1998 | (EP) . |
| 10 060034 | 6/1998 | (JP) . |
| WO 92/15596 | 9/1992 | (WO) . |
| WO 96/33227 | 10/1996 | (WO) . |
| WO 97/19959 | 6/1997 | (WO) . |
| WO 97/22635 | 6/1997 | (WO) . |
| WO 97/29845 | 8/1997 | (WO) . |
| WO 99/06412 | 2/1999 | (WO) . |

OTHER PUBLICATIONS

Silolene–Bridged Zirconocenium Polymerization Catalysts, Woei–min Tsai and James C.W. Chien, Dept. of Polymer Science and Engineering, Materials Research Laboratories, University of Massachusetts, 1993, pp. 149–158.

Stereoselective Synthesis of a Germanium–Bridged Zirconocene for Temperature–Invariant Propylene Polymerizations, You–Xian Chen, Marvin D. Rausch, and James C.W. Chien, OrganoMetallics 1994, 13, 748–749.

New ansa–Metallocenes of the Group 4 Transition Metals as Homogeneous Catalysts for the Polymerization of Propene and Styrene, Malcolm L.H. Green and Nobuhide Ishihara, Inorganic Chemistry Laboratory, J. Chem. Soc. Dalton Trans. 1994, pp. 657–665.

(List continued on next page.)

*Primary Examiner*—David W. Wu
*Assistant Examiner*—Ling-Siu Choi
(74) *Attorney, Agent, or Firm*—William G. Muller; Stephen D. Prodnuk

(57) ABSTRACT

The invention is directed to olefin polymerization processes using bridged hafnocene catalyst complexes comprising highly substituted noncoordinating anions that are surprisingly stable under high temperature olefin polymerization processes such that olefin copolymers having significant amount of incorporated comonomer can be prepared with high molecular weights. More specifically, the invention is a polymerization process for ethylene copolymers having a melt index of about 0.87 to about 0.930 comprising contacting, under homogeneous polymerization conditions at a reaction temperature at or above 140° C. to 225° C., ethylene and one or more comonomers capable of insertion polymerization with a bridged hafnocene catalyst complex derived from A) a biscyclopentadienyl hafnium organometallic compound having i) at least one unsubstituted cyclopentadienyl ligand or aromatic fused-ring substituted cyclopentadienyl ligand, ii) one aromatic fused-ring substituted cyclopentadienyl ligand, iii) and a covalent bridge connecting the two cyclopentadienyl ligands, said bridge comprising a single carbon or silicon atom; and B) an activating cocatalyst, precursor ionic compound comprising a halogenated tetraaryl-substituted Group 13 anion wherein each aryl substituent contains at least two cyclic aromatic rings.

21 Claims, No Drawings

OTHER PUBLICATIONS (1,3–Propanediyl) silylene–bis(l–indenyl) dichlorozirconium. Synthesis and polymerization catalysis, You–Xian chen, Marvin D. Rausch, James C.W. Chien, Journal of Organometallic Chemistry 487, 1995, 29–34.

Synthesis and characterization of ansa–[1,1–bis(inden–1, 1–diyl)–1–silacyclopentane]zirconium dichlorides. Crystal structures of meso– and racemic–[1,1–bis inden–1,1–diyl) – 1–silacyclopentane]–dichloro zirconium and racemic–[1, 1–bis(4,5,6,7–tetrahydroinden–1, 1–diyl)–1–sila–cylopentane]dichlorozirconium, Hendrik J.G. Luttikhedde, Reko P. Leino, Jan H. Näsman, Markku Ahlgrén, Tapani Pakkanen, Journal of Organometallic Chemistry 486, 1995, 193–198.

Preparation and X–ray structure of a novel chiral methylene bridged titanocene complex, Christopher A. Willoughby, William M. Davis, Stephen L. Buchwald, Journal of Organometallic Chemistry 497, 1995, 11–15.

* cited by examiner

HIGH TEMPERATURE OLEFIN POLYMERIZATION PROCESS

This application claims the benefits to provisional application 60/076,712 filed Mar. 4, 1998 which claims benefit to 60/087,445 filed Jun. 1, 1998 which claims benefit to 60/087,447 filed Jun. 1, 1998 which claims benefit to 60/076,841 filed Mar. 4, 1998 which claims benefit to 60/087,446 filed Jun. 1, 1998.

TECHNICAL FIELD

This invention relates to high temperature olefin polymerization processes using hafnocene catalyst compounds with noncoordinating anions.

BACKGROUND OF THE INVENTION

Olefin polymers comprising ethylene and at least one or more α-olefin and optionally one or more diolefin make up a large segment of polyolefin polymers and will be addressed for convenience as "ethylene copolymers" herein. Such polymers range from crystalline polyethylene copolymers to largely amorphous elastomers, with a new area of semi-crystalline "plastomers" in between. In particular, ethylene copolymer plastomers are becoming a well established class of industrial polymers having a variety of uses associated with their unique properties, such as elastomeric properties and their thermo-oxidative stability. Uses of the plastomers include general thermoplastic olefins, films, wire and cable coatings, polymer modification (by inclusion in blends with other polyolefins), injection molding, foams, footwear, sheeting, functionalized polymers (such as by free-radical graft addition of polar monomers) and components in adhesive and sealant compounds.

Commercially prepared ethylene copolymers have traditionally been made via Ziegler-Natta polymerization with catalyst systems largely based on vanadium or titanium. Newer metallocene catalyst compounds have received attention due to their ease of larger monomer incorporation and potential increases in polymerization activities. U.S. Pat. No. 324,800 describes metallocenes having substituted and unsubstituted cyclopentadienyl ligands which are suitable for producing high molecular weight olefin polymers, including linear, low density copolymers of ethynyl with minor amounts of α-olefin.

Noncoordinating anions useful as catalyst components with such metallocenes are known. The term "noncoordinating anion" is now accepted terminology in the field of olefin polymerization, both by coordination or insertion polymerization and carbocationic polymerization. The non-coordinating anions function as electronic stabilizing cocatalysts, or counterions, for cationic metallocenes which are active for olefin polymerization. The term "noncoordinating anion" as used here and in the references applies both to noncoordinating anions and weakly coordinating anions that are not so strongly coordinated to the cationic complex as to be labile to replacement by olefinically or acetylenically unsaturated monomers at the insertion site. U.S. Pat. No. 5,198,401 describes a preferred noncoordinating anion tetra(perflourophenyl) boron, $[B(Pfp)_4]^{31}$ or $[B(C_6F_5)_4]^-$, wherein the perfluorinated phenyl ligands on the boron makes the counterion labile and stable to potential adverse reactions with the metal cation complexes. Other aryl radicals are said to be suitable; in addition to the phenyl radicals, napthyl and anthracenyl are listed. In a related European application EP 0 277 004, hafnocenes activated with anion providing catalyst precursor components are said to be preferred for high molecular weight products and for increased incorporation of olefins and diolefin comonomers with ethylene.

U.S. Pat. No. 5,296,433 teaches the utility of borane complexes comprising tris(pentafluorophenyl)borane and specific complexing compounds. These complexes are said to allow higher molecular weight polymers when used with metallocenes for olefin polymerization due to increased solubility of the complexes in monomer or monomer solutions. In particular, fluorenyl ligands on the metallocenes are said to be particularly useful for high molecular weight, rubbery polyolefins as observed from the degree of polymerization of poly-1-hexene with $[(fluorenyl)_2ZrMe]^+$ $[C_{18}H_{37}O.B(C_6F_5)_3]^-$ in Table 1. WO 97/29845 describes the preparation of the organo-Lewis acid perfluorobiphenylborane, and its use to prepare and stabilize active, olefin polymerization catalysts. These cocatalysts are describe as being less coordinating than tris (perfluorophenyl)boron, $B(C_6F_5)_3$, and thus capable of providing higher catalytic activities. Generic description of the suitable cocatalysts according to the application include those of the formula BR'R" where B is boron with R' being fluorinated biphenyl and R" representing at least one fluorinated phenyl, biphenyl or other polycyclic group, such as napthyl, anthryl or fluorenyl. These cyclic groups on the phenyl ligands are said to be suitable inn any of the ortho-, meta- or para-positions, but only the ortho-position is exemplified in the working examples.

The utility of metallocene-based ionic catalysts in high temperature olefin polymerization is described in U.S. Pat. No. 5,408,017, EP 0 612 768, WO 96/33227 and WO 97/22635. Each addresses suitable metallocene catalysts for high temperature processes for olefin copolymerization. High molecular weight ethylene/α-olefin copolymers is an objective of EP 0 612 768 and is addressed with catalyst systems based on bis(cyclopentadienyl/indenyl/fluorenyl) hafnocenes which are combined with an alkyl aluminum compound and an ionizing ionic compound providing a non-coordinating anion.

As described above, a recognized problem for high temperature polymerization, particularly where significant content of comonomer incorporation in ethylene copolymers is to be sought, is an observed decrease in molecular weight, or increase in melt index. Means of maintaining high molecular weights, or low M.I., in ethylene copolymers of low density (high comonomer content) while operating at economically preferable high polymerization reaction temperatures and high polymer production rates is highly desirable.

INVENTION DISCLOSURE

The invention thus addresses bridged hafnocene catalyst complexes comprising noncoordinating anions that are surprisingly stable under high temperature olefin polymerization processes such that olefin copolymers having significant amount of incorporated comonomer can be prepared with unexpectedly high molecular weights. More specifically, the invention relates to a polymerization process for ethylene copolymers having a density of about 0.87 to about 0.930 comprising contacting, under homogeneous polymerization conditions at a reaction temperature at or above 140° C. to 220° C., ethylene and one or more comonomers capable of insertion polymerization with a hafnocene catalyst complex derived from A) a biscyclopentadienyl hafnium organometallic compound having i) at least one unsubstituted cyclopentadienyl ligand or aromatic fused-ring substituted cyclopentadienyl ligand, ii) one aromatic fused-ring substituted cyclopentadienyl ligand, iii) and a covalent bridge connecting the two cyclopentadienyl ligands, said bridge comprising a single carbon or silicon atom; and B) an activating cocatalyst, precursor ionic compound comprising a halogenated tetraaryl-substituted Group 13 anion wherein each aryl substituent contains at least two cyclic aromatic rings.

BEST MODE AND EXAMPLES OF THE INVENTION

The bridged hafnium compounds of the invention include those having one substituted or unsubstituted carbon or substituted silicon atom bridging two cyclopentadienyl (Cp) ligands of the hafnium metal centers, the aromatic fused-ring substituted cyclopentadienyl ligand or ligands optionally containing substituents on the non-cyclopentadienyl aromatic rings selected from $C_1$–$C_{20}$ hydrocarbyl or hydrocarbylsilyl substituents. Substituents typically include one or more $C_1$ to $C_{30}$ hydrocarbon or hydrocarbylsilyl groups selected from linear, branched, cyclic, aliphatic, aromatic or combined groups, whether in a fused-ring or pendant configuration. Examples include methyl, isopropyl, n-propyl, n-butyl, isobutyl, tertiary butyl, neopentyl, phenyl, and benzyl. For the purposes of this application the term "hydrocarbon" or "hydrocarbyl" is meant to include those compounds or groups that have essentially hydrocarbon characteristics but optionally contain not more than about 10 mol % non-carbon, polar atoms, such as oxygen, sulfur, nitrogen and phosphorous. "Hydrocarbylsilyl" is exemplified by, but not limited to, trimethylsilyl. Similarly the use of heteroatom containing cyclopentadienyl rings or fused ring, where a non-carbon Group 14 or 15 atom replaces one of the ring carbons in the Cp ring or in a fused rings, is considered for this specification to be within the terms "cyclopentadienyl", "indenyl", and "fluorenyl".

Specific bridged hafnium catalysts include those derived from: (1) indenyl-based complexes such as the rac - or meso-isomer, or mixtures, of dimethylsilyl bis (indenyl) hafnium dimethyl, dimethylsilyl bis(2-methyl-indenyl) hafnium dimethyl, dimethylsilyl bis(2-propyl-indenyl) hafnium dimethyl, dimethylsilyl bis(4-methyl, 2-phenyl-indenyl) hafnium dimethyl, methylene (indenyl) (2,7-di tertbutyl fluorenyl) hafnium dimethyl and diphenylmethylene (indenyl) (2,7-bis tert-butyl fluorenyl) hafnium dibenzyl; and, (2) fluorenyl-based complexes such as dibutylsilyl (fluorenyl) (cyclopentadienyl) hafnium dimethyl, dimethylsilyl (indenyl) (fluorenyl) hafnium dihydride, i-propyl (cyclopentadienyl) (fluorenyl) hafnium dimethyl, dinaphthylmethylene (cyclopentadienyl)(fluorenyl) hafnium dimethyl, diphenylmethylene (2,7-di tertbutyl, 5-methylfluorenyl) (cyclopentadienyl) hafnium dimethyl, diphenylmethylene (2,7-di para-n-butyl fluorenyl) (cyclopentadienyl) hafnium dimethyl, diphenylmethylene (cyclopentadienyl) (2,7-dimethyl fluorenyl) hafnium dimethyl, diphenylmethylene (cyclopentadienyl) (2,7-di-tertbutyl fluorenyl) hafnium dimethyl, methylene (2,7-di tertbutyl fluorenyl) (fluorenyl) hafnium dimethyl, diphenylmethylene (2,7-di tertbutyl fluorenyl) (fluorenyl) hafnium dimethyl, methylene bis(fluorenyl) hafnium dimethyl, and methylphenylmethylene bis(fluorenyl) hafnium dimethyl. It has been found that the asymmetric, bridged compounds, such as those listed above, are particularly useful in accordance with the invention.

In particular, for the bridged hafnium compounds, increasing the degree of substitution on the aromatic fused-ring substituted ligand is effective for increased molecular weight, as is the use of covalent bridges between the cyclopentadienyl ligands having a substituted or unsubstituted carbon atom ($-CH_2-$, or $-CHR-$, or $-CR_2-$) or substituted silylene ($-SiR_2-$) bridging unit, where each R may be the same or different $C_1$ to $C_{20}$ hydrocarbyl substitutent, or where the two R's may be covalently linked to form a cyclic structure. Preferably the substitution on the indenyl, fluorenyl or azulenyl radicals in the hafnium compounds will generally comprise two or more $C_1$ to $C_{30}$ hydrocarbon substituents on a 6-member fused-ring as defined above.

The term "cyclopentadienyl" refers to a 5-member ring having delocalized bonding within the ring and typically being bound to M through $\eta^5$-bonds, carbon typically making up the majority of the 5-member positions.

The bridged hafnocenes described in WO 96/33227, WO 97/22635 and EP 0 612 768 are additionally suitable, the description and examples of these documents are incorporated by reference for the purposes of U. S. patent practice.

The invention activating cocatalyst, precursor ionic compounds comprise anionic Group 13 element complexes having four halogenated aromatic ligands typically bulkier than substituted tetraphenyl boron compounds exemplified in the identified prior art. These invention aromatic ligands consist of polycyclic aromatic hydrocarbons and aromatic ring assemblies in which two or more rings (or fused ring systems) are joined directly to one another or together. These ligands, which may be the same or different, are covalently bonded directly to the metal/metalloid center. In a preferred embodiment the aryl groups of said halogenated tetraaryl Group 13 element anionic complex comprise at least one fused polycyclic aromatic hydrocarbon or pendant aromatic ring. Indenyl, naphthyl, anthracyl, heptalenyl and biphenyl ligands are exemplary. The number of fused aromatic rings is unimportant so long as the ring junctions and especially the atom chosen as the point of connection to the Group 13 element center permit an essentially tetrahedral structure. Thus, for example, suitable ligands include those illustrated below, the open bond being to the Group 13 atom. See also the polycyclic compound examples in the literature for additional ligand selection, e.g., *Nomenclature of Organic Compounds*, Chs. 4–5 (ACS, 1974).

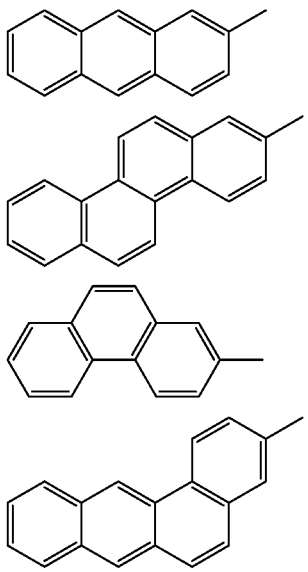

I

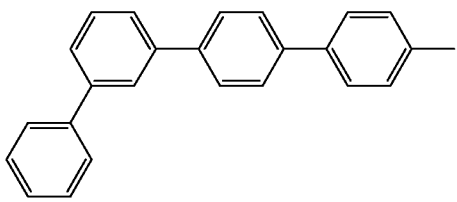

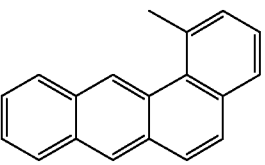

Suitable mixed-ligand Group 13 complexes can include fused rings or ring assemblies with ortho-substituents, or ring junctions, so long as those ligands do not exceed two in number. Thus Group 13 anions with one or two hindered fused ring aromatics with three or two unhindered ligands, where hindered aromatics are those having ortho substituents or ring junctions (illustration II) and unhindered are those without (illustration I), will typically be suitable. Tris(perfluorophenyl) (perfluoroanthracyl) borate is an illustrative complex. In this complex the anthracyl ligand is a hindered fused ring having ortho-substituents but its use with three unhindered phenyl ligands allows the complex to adopt a tetrahedral structure. Thus, generically speaking, the Group 13 complexes useful in accordance with the invention will typically conform to the following formula:

$$[M(A)_{4-n}(R)_n]^-$$

where M is a Group 13 element, A is an unhindered ligand as described above, R is a hindered ligand as described above, and n =1,2.

For both fused aromatic rings and aromatic ring assemblies, halogenation is highly preferred so as to allow for increased charge dispersion that contributes along with steric bulk as independent features decreasing the likelihood of ligand abstraction by the strongly Lewis acidic metallocene cation formed in the catalyst activation. Additionally, halogenation inhibits reaction of the hafnium cation with any remaining carbon-hydrogen bonds of the aromatic rings, and perhalogenation precludes such potential undesirable reactions. Thus it is preferred that at least one third of hydrogen atoms on carbon atoms of the aryl ligands can be replaced by halogen atoms, and more preferred that the aryl ligands be perhalogenated. Fluorine is the most preferred halogen.

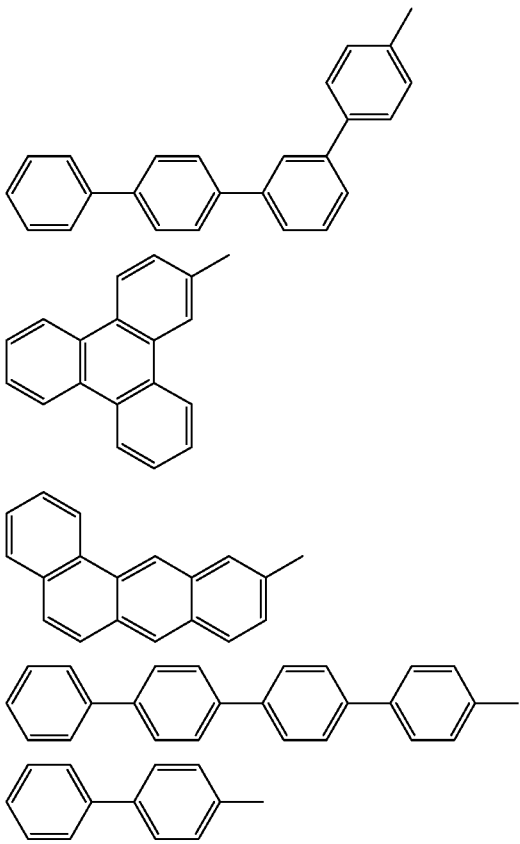

The choice of ligand connection point is particularly important. Substituents or ring junctions ortho to the ligand connection point present such steric bulk that adoption of an essentially tetrahedral geometry is largely precluded. Examples of undesirable connection points are depicted below.

Means of preparing ionic catalyst systems comprising catalytically active cations of the hafnium compounds and suitable noncoordinating anions are conventionally known, see for example U.S. Pat. No. 5,198,401, WO 92/00333, and WO 97/22639. Typically the methods comprise obtaining from commercial sources or synthesizing the selected transition metal compounds comprising an abstractable ligand, e.g., hydride, alkyl or silyl group, and contacting them with a noncoordinating anion source or precursor compound in a suitable solvent. The anion precursor compound abstracts a univalent hydride, alkyl or silyl ligand that completes the valency requirements of the preferred hafnium metallocene compounds. The abstraction leaves the hafnocenes in a cationic state which is counterbalanced by the stable, compatible and bulky, noncoordinating anions according to the invention.

The noncoordinating anions are preferably introduced into the catalyst preparation step as ionic compounds having an essentially cationic complex which abstracts a non-cyclopentadienyl, labile ligand of the transition metal compounds which upon abstraction of the non-cyclopentadienyl ligand, leave as a by-product the noncoordinating anion portion. Hafnium compounds having labile hydride, alkyl, or silyl ligands on the metal center are highly preferred for

II

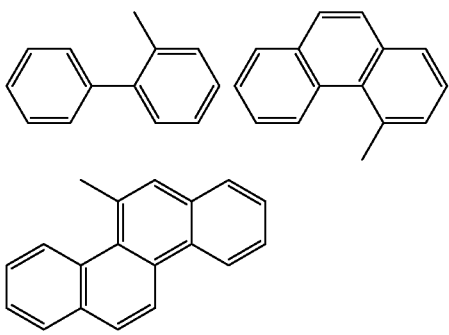

the ionic catalyst systems of this invention since known in situ alkylation processes may result in competing reactions and interactions that tend to interfere with the overall polymerization efficiency under high temperature conditions in accordance with the preferred process embodiments of the invention.

Suitable cations for precursor compounds capable of providing the noncoordinating anions of the invention cocatalysts include those known in the art. Such include the nitrogen-containing cations such as those in U.S. Pat. No. 5,198,401 and WO 97/35893, the carbenium, oxonium or sulfonium cations of U.S. Pat. No. 5,387,568, metal cations, e.g., $Ag^+$, the silylium cations of WO 96/08519, and the hydrated salts of Group 1 or 2 metal cations of WO 97/22635. Each of the documents of this paragraph are incorporated by reference for purposes of U.S. patent practice.

Examples of preferred precursor salts of the noncoordinating anions capable of ionic cationization of the metallocene compounds of the invention, and consequent stabilization with a resulting noncoordinating anion include trialkyl-substituted ammonium salts such as triethylammonium tetrakis(perfluoronaphthyl or tetrakis(perfluoro-4-biphenyl)borate, tripropylammonium tetrakis (perfluoronaphthyl or tetrakis(perfluoro-4-biphenyl)borate, tri(n-butyl)ammonium tetrakis(perfluoronaphthyl or tetrakis (perfluoro-4-biphenyl)borate, trimethylammonium tetrakis (perfluoronaphthyl or tetrakis(perfluoro-4-biphenyl)borate, tributylammonium tetrakis(perfluoronaphthyl or tetrakis (perfluoro-4-biphenyl)borate, and the like; N,N-dialkyl anilinium salts such as N,N-dimethylanilinium tetrakis (perfluoronaphthyl) or tetrakis(perfluoro-4-biphenyl)borate, N,N-diethylanilinium tetrakis(perfluoronaphthyl) or tetrakis (perfluoro-4-biphenyl)borate, N,N-2,4,6-pentamethylanilinium tetrakis(perfluoronaphthyl) or tetrakis (perfluoro-4-biphenyl)borate and the like; dialkyl ammonium salts such as di-(isopropyl)ammonium tetrakis (perfluoronaphthyl or tetrakis (perfluoro-4-biphenyl)borate, dicyclohexylammonium tetrakis(perfluoronaphthyl or tetrakis(perfluoro-4-biphenyl)borate and the like; and triaryl phosphonium salts such as triphenylphosphonium tetrakis (perfluoronaphthyl or tetrakis (perfluoro-4-biphenyl)borate, tri(methylphenyl) phosphonium tetrakis(perfluoronaphthyl or tetrakis(perfluoro-4-biphenyl)borate, tri(dimethylphenyl) phosphonium tetrakis(perfluoronaphthyl or tetrakis (perfluoro-4-biphenyl)borate and the like.

Further examples of suitable anionic precursors include those comprising a stable carbenium ion, and a compatible non-coordinating anion. These include tropillium tetrakis (perflouronaphthyl or tetrakis(perfluoro-4-biphenyl) borate, triphenylmethylium tetrakis(perflouronaphyl or tetrakis (perfluoro-4-biphenyl) borate, and benzene (diazonium) tetrakis(perflouronaphthyl or tetrakis (perfluoro-4-biphenyl) borate. The essentially structurally equivalent silylium borate or aluminate salts are similarly suitable.

The term "scavenger" as used in this application is used in its art-recognized sense of being sufficiently Lewis acidic to coordinate with polar contaminates and impurities adventitiously occurring in the polymerization feedstreams or reaction medium. Such impurities can be inadvertently introduced with any of the polymerization reaction components, particularly with solvent, monomer and catalyst feed, and adversely affect catalyst activity and stability. In particular, for processes utilizing recycle streams of unconverted monomer for reprocessing, the necessity to use polar compounds as catalyst deactivators, or "killers", such as water or lower alcohols, effectively necessitates the use of scavengers, as does the natural occurrence of polar impurities in monomer feedstreams. It can result in decreasing or even elimination of catalytic activity, particularly when a metallocene cation-noncoordinating anion pair is the catalyst system. The polar impurities, or catalyst poisons include water, oxygen, metal impurities, etc. Preferably steps are taken before provision of such into the reaction vessel, for example by chemical treatment or careful separation techniques after or during the synthesis or preparation of the various components, but some minor amounts of scavenging compound will still normally be required in the polymerization process itself.

Typically the scavenging compound will be an organometallic compound such as the Group-13 organometallic compounds of U.S. Pat. No. 5,241,025, EP-A-0 426 638 and those of WO 97/22635. Exemplary compounds include triethyl aluminum, triethyl borane, tri-isobutyl aluminum, methylalumoxane, isobutyl aluminumoxane, tri-n-hexyl aluminum and tri-n-octyl aluminum, those having bulky substituents covalently bound to the metal or metalloid center being preferred to minimize adverse interaction with the active catalyst. Addition of excess scavenger causes lower productivity, molecular weight and comonomer incorporation. The aluminum to hafnium molar ratios (Al:Hf) should accordingly be less than about 100:1, preferably less than about 75:1, more preferably less than about 50:1, and most preferably less than about 30:1. Molar ratios of less than 20:1 and less than 15:1 have been observed to be sufficient for the continuous processes described in this application.

The preferred scavenger is a long chain, linear tri-alkyl aluminum compound, and longer chains are preferred over shorter chains. See WO 97/22635 for further discussion; this document is incorporated by reference for purposes of U.S. Patent practice. Non-limiting examples of effective long chain, linear tri-alkyl ligand-containing scavengers include those comprised in the group defined by the formula M'R'R"R'", where M'is Al, and each of the R groups independently is a $C_4$ or higher linear, branched or cyclic alkyl group, preferably $C_6$ or higher, most preferably $C_8$ or higher. The long chain, linear alkyl aluminums where each alkyl substituent was of a length of $C_8$ or higher, preferably $C_9$ and higher were observed to exhibit optimal performance, that defined as having the least deleterious effect when used at a level in excess of the optimum level as described in the following paragraph. Specifically included are: tri-n-octyl aluminum, tri-n-decyl aluminum, tri-n-dodecyl aluminum, tri-n-hexadecyl aluminum, and the higher carbon number equivalents, e.g., $(C_{20})_3Al$, including those with mixed ligation, and mixed scavenger compounds as well. The hydrolyzed derivatives of these alkyl-ligand containing organoaluminum compounds will additionally be suitable. Additionally, it will be apparent that those scavenging compounds comprising both long-chain, linear and bulky ligands or mixed linear ligands, each ligand as described above, will also be suitable, but perhaps less desirable due to more involved or expensive syntheses.

A preferred polymerization process is that designed or conducted such that the cocatalyst components, that is the transition metal compounds and the anion precursor compounds, are maintained separately until just prior to or during polymerization use in the chosen reactor or reactors. An example is the use of dual injection of each catalyst component directly into the reactor or the use of T- or multi-joint mixing chambers just prior to injection into the reactor. Additional optimization can be achieved when the scavenger compound is introduced into the reactor independently of the catalyst system or compounds, preferably after the activation of the hafnocenes with the anion precursor cocatalysts.

The process of the invention is applicable to high pressure homogeneous polymerization, preferably employing less than 30 wt % of solvent, which is substantially adiabatic and where the heat of polymerization is accommodated by a rise in temperature of the reactor contents instead of internal or external cooling. In this case, the contents consist principally of unreacted monomer. Such process may be performed, under a single or dual phase homogeneous conditions at pressures from 250 to 3000 bar, preferably from 500 to 2500 bar, with or without unreactive diluents or solvents at temperatures generally above the melting point of the polymer being produced. Such processes are industrially known and may include the use of scavenger compounds and catalyst deactivation or killing steps, see for example U.S. Pat. No. 5,408,017, WO 95/07941, and WO 92/14766. Each of these documents and their U.S. counterparts are incorporated by reference for purposes of U.S. patent practice. Preferred catalyst deactivators, or killers, include high molecular weight, non-recyclable compounds, such as poly vinyl alcohol which exhibit the functional capacity to complex with the catalysts so as to deactivate them while not forming volatile polar by-products or residual unreacted compounds.

The process of the invention is also especially applicable to homogeneous solution polymerization which is also substantially adiabatic, that is to say the heat of polymerization is accommodated by a rise in temperature of the polymerization reactor contents, here principally solvent. This adiabatic process typically would have no internal cooling and suitably no external cooling. The reactor outlet stream removes the heat of polymerization from the reactor. The productivity of such adiabatic processes can be improved by cooling the inlet solvent and/or monomer stream(s) prior to introduction into the reactor to permit a greater polymerization exotherm. Thus the catalyst, cocatalyst and scavenger selections disclosed in this application can be advantageously practiced in a continuous, solution process operated at or above 140° C., above 150° C. or above 160° C., up to about 225° C. Typically this process is conducted in an inert hydrocarbon solvent, linear, cyclic or branched aliphatic, or aromatic, at a pressure of from 20 to 200 bar.

These catalyst's ability to provide a commercially desirable polymer at elevated temperatures contributes to a greater exotherm, to high polymer contents in the reactor because of lower viscosity, and to reduced energy consumption in evaporating and recycling solvent, and better monomer and comonomer conversions.

The α-olefins suitable for use in the preparation of the ethylene copolymers, or for the polyethylene copolymers, are preferably $C_3$ to $C_{20}$ α-olefins, but will include higher carbon number olefins such as polymerizable macromers having up to five hundred carbon atoms, or more. Illustrative non-limiting examples of such αc-olefins are one or more of propylene, 1-butene, 1-pentene, 1-hexene, 1-octene, and 1-decene. Included in the term α-olefins for the purposes of describing effectively copolymerized monomers are the constrained-ring cyclic monoolefins such as cyclobutene, cyclopentene, norbornene, alkyl-substituted norbornes, alkenyl-substituted norbornes, and the higher carbon number cyclic olefins known in the art, see U.S. Pat. No. 5,635,573, incorporated herein by reference for purposes of U.S. patent practice. These copolymers can range from semicrystalline to substantially amorphous; and will typically have a substantially random arrangement of at least the ethylene and the α-olefin monomers.

The ethylene copolymer plastomers will preferably exhibit semi-crystalline characteristics, e.g., melting points ranging from about 85° C. to 115° C. The molecular weight (number-average molecular weight) of the plastomers of the invention will range from about 10,000 to about 60,000, preferably about 20,000 to about 50,000. The molecular weight for ethylene copolymer plastomers is more typically stated in terms of their polyethylene melt index (MI) (defined in ASTM 1238, Cond. E), those will typically range form 0.01 to 10.0, preferably 0.02 to 6.0, more preferably 0.03 to less than 4.0.

In terms of polymer density, the polymers capable of production in accordance the invention, can range from about 0.870 to about 0.920, preferably from 0.088 to 0.915, more preferably 0.089 to 0.910. The plastomers of the invention will contain about 60 to about 80 weight percent ethylene, preferably about 60 to 75 weight percent ethylene.

EXAMPLES

The following examples are presented to illustrate the foregoing discussion. All parts, proportions and percentages are by weight unless otherwise indicated. Although the examples may be directed to certain embodiments of the present invention, they are not to be viewed as limiting the invention in any specific respect. In Tables 1 and 2, "MCN" is an abbreviation for metallocene, particularly the hafnocenes of the invention, and "CC" is an abbreviation for co-catalyst.

I. High Temperature Semi-Batch Polymerization

Example 1: Ethylene/1-octene copolymerizations were carried out in a well-stirred semi-batch reactor (0.5 L) equipped to perform coordination polymerization in the presence of an inert hydrocarbon (hexane) solvent at pressures up to 350 psig and temperatures up to 150° C. In the vapor-liquid (VL) polymerization system, the polymerization occurs in the liquid phase whereas ethylene was continuously fed to the reactor to keep the vapor phase overhead pressure constant at 265 psig during the polymerization. In those experiments, the reactor temperature was kept constant at 140° C. by throttling the amount of steam added to the reactor mantle and by adjusting the amount of catalyst fed to the reactor by the pump. Typically, 250 ml of dried n-hexane, 18 ml or 36 ml of dried 1-octene, and 200 $\mu l$ of tri-n-octyl aluminum (TOA), a poisons scavenger, were fed to the reactor which was then brought to 140° C. The reactor content was then pressurized to 265 psig by feeding ethylene and maintained at constant ethylene pressure throughout the polymerization. The polymerization was started by continuously feeding a pre-activated toluene solution of the catalyst during 30 minutes. The catalyst flow rate was stopped, the reactor depressurized, and allowed to cool to room temperature. The product was precipitated out of solution was then dried in an oven at 100° C. for 8 hr. All values reported are average values from 2 or more runs under the same conditions.

| Symbols for Tables 1 and 2 below | |
| --- | --- |
| Catalyst | Metallocene Compound |
| ("MCN") | |
| A | diphenylmethylene(cyclopentadienyl)(fluorenyl) hafnium dimethyl |
| B | dimethylsilyl bis(indenyl) hafnium dimethyl |
| C | phenylmethylene bis(fluorenyl) hafnium dimethyl |
| Co-catalyst | Group 13 Compound |
| ("CC") | |
| I | [N,N-dimethylanilinium] [tetrakis(heptafluoronaphthyl)borate] |
| II | [N,N-dimethylanilinium] [tetrakis(perfluoro-4-biphenyl)borate] |
| III (Comparison) | [N,N-dimethylanilinium] [tetrakis(perfluorophenyl)borate] |
| IV (Comparison) | tris(perfluorophenyl) borane |

TABLE 2

| Ex II # | MCN | CC | Temp (° C.) | % C2 Conv. | kg PE/ g -MCN | density g/ml | MIR $I_{21.6}/I_2$ | PDI $M_w/M_n$ | MI dg/min |
| --- | --- | --- | --- | --- | --- | --- | --- | --- | --- |
| 1 | B | I | 151 | 86.4% | 675 | 0.899 | 46.8 | 2.3 | 0.49 |
| 2 | B | II | 150 | 87.3% | 552 | 0.899 | 43.0 | 2.3 | 0.85 |
| 3 (c) | B | III | 150 | 85.0% | 450 | 0.903 | 33.0 | nm | 3.0 |
| 4 (c) | B | IV | 150 | 85.0% | 300 | 0.900 | nm | nm | 3.0 |
| 6 | A | I | 171 | 84.8% | 281 | 0.899 | 53.3 | 2.4 | 0.29 |
| 7 | A | II | 172 | 85.5% | 245 | 0.897 | 34.1 | 2.4 | 2.0 |
| 8 (c) | A | III | 171 | 86.9% | 135 | 0.901 | 31.0 | 2.2 | 3.6 | note: C - comparison; nm - not measured

TABLE 1

| EX I MCN/CC | Yield (g) | MCN (mg) | CE (g/g) | Wt % $C_8$ (H-NMR) | $M_w$ GPC-DRI | $M_n$ GPC-DRI | PDI GPC-DRI |
| --- | --- | --- | --- | --- | --- | --- | --- |
| 1) A/I | 8 | 13 | 615 | 28.4 | 154,188 | 68,343 | 2.25 |
| 2) A/II | 22.1 | 20 | 1107 | 24.6 | 155,658 | 61,280 | 2.58 |
| 3) A/III (c) | 5.1 | 13 | 392 | 29.2 | 155,658 | 53,747 | 2.15 |
| 4) B/II | 23 | 4.8 | 4802 | 21.2 | 90,934 | 38,741 | 2.34 |
| 5) B/III (c) | 11.9 | 17.6 | 676 | 25 | 64,163 | 31,365 | 2.06 |
| 6) C/I | 7.5 | 20 | nm | 36.3 | 80,605 | 38,172 | 2.11 |
| 7) C/III (c) | 6.6 | 15.0 | nm | 42.2 | 57,933 | 31,822 | 1.83 | notes: nm means "not measured".

II. Continuous High Temperature Solution Process

The following polymerization reactions were performed in a stirred, liquid filled 2 L jacketed steel reactor equipped to perform continuous insertion polymerization in presence of an inert $C_6$ hydrocarbon (naphta) solvent at pressures up to 120 bar and temperatures up to 240° C. The reactor was typically stirred at 1000 rpm during the polymerization. The reaction system was supplied with a thermocouple and a pressure transducer to monitor changes in temperature and pressure continuously, and with means to supply continuously purified ethylene, 1-octene, and solvent. In this system, ethylene dissolved in the hydrocarbon solvent, 1-octene, tri-n-octyl aluminum (TOA) used as a scavenger, and optionally H2, are pumped separately, mixed, and fed to the reactor as a single stream, refrigerated to −40° C. using liquid $NH_3$ as a coolant. The transition metal component (TMC) was dissolved in a solvent/toluene mixture (9/1 vol/vol) whereas the non-coordinating anion (NCA) activator was dissolved in toluene or slurried in the hydrocarbon solvent. Both components were pumped separately, mixed at ambient temperature, and cooled to -1 ° C. prior to entering the reactor. The reactor temperature was set by adjusting the temperature of an oil bath used as a reservoir for the oil flowing through the reactor wall jacket. Next, the polymer molecular weight (MW) or MI was controlled independently by adjusting the ethylene conversion (% $C_2$) in the reactor via the catalyst flow rate. Finally, the polymer density was controlled by adjusting the ethylene/1-octene weight ratio in the feed.

The results of the eight polymerization experiments performed in the reactor described above with two different transition metal compounds (A and B), and five ionizing activators are summarized in Table 2. For example, the polymerization reaction in example II run #1 was carried out at 151.2° C. and 57.2 bar with compound B activated by dimethyl anilinium tetrakis (heptafluoro-naphthyl)borate. The 1-octene/ethylene weight ratio in the feed was 0.36 wt/wt in this case. Both catalyst components were continuously fed to the reactor, resulting in an ethylene conversion of 86.4% and a 1-octene conversion of 60.1%. For a reactor residence time of 8 minutes, the polymer yield was 1.4g kg/hr. under these conditions. By adding TOA at a rate of 0.08 mmol/hr. to the feed, the catalyst efficiency (CE) lined out around 348 kg PE/g B. This experiment resulted in an ethylene/1-octene copolymer containing 18.8 weight % comonomer (by FTIR) and having the characteristics reported in Table 2.

This data summarized in Tables 1 and 2 indicate that the A, B and C hafnocene compounds activated by cocatalysts I and II exhibit superior molecular weight and activity capability for the polymerization of ethylene and 1-octene in high-temperature solution processes than if they are activated by the conventional pentafluorophenyl-based activators III and IV. For example, at 170° C. and 85% ethylene conversion, the MI drops from 1.6 to 0.2 dg/min at comparable density (0.900 g/cc) whereas the catalyst activity increases from 150 to 350 kg PE/g when I is used to activate the A catalyst in place of III.

Similarly, catalyst B exhibits better molecular weight ($M_n$) and activity capability when activated by II than if it is activated by the pentafluorophenyl-based activators III-IV.

The following is claimed:

1. A polymerization process for ethylene copolymers having a density of about 0.87 to about 0.93 comprising contacting, under homogeneous polymerization conditions at a reaction temperature at or above 140° C. to 220° C., ethylene and one or more comonomers capable of insertion polymerization with a hafnocene catalyst complex derived from:
   (A) a biscyclopentadienyl hafnium organometallic compound having:
      (i) one unsubstituted cyclopentadienyl ligand and one aromatic fused-ring substituted cyclopentadienyl ligand, or two aromatic fused-ring substituted cyclopentadienyl ligands; and
      (ii) a covalent bridge connecting the two cyclopentadienyl ligands, said bridge comprising a single carbon or silicon atom; and
   (B) an activating cocatalyst precursor ionic compound comprising a halogenated tetraaryl-substituted Group 13 anion wherein each aryl substituent contains at least two cyclic aromatic rings.

2. The process of claim 1 wherein said hafnium compound has at least one substituted or unsubstituted fluorenyl ligand.

3. The process of claim 2 wherein said hafnium compound is covalently bridged between the biscyclopentadienyl ligands with a substituted or unsubstituted carbon atom.

4. The process of claim 3 wherein said carbon atom is substituted with at least one aryl group.

5. The process of claim 4 wherein said hafnium compound is selected from the group consisting of diphenyl methylene (cyclopentadienyl)(9-fluorenyl) hafnium dimethyl, diphenyl methylene (cyclopentadienyl) (2,7-dimethyl-9-fluorenyl) hafnium dimethyl and diphenyl methylene (cyclopentadienyl)(2,7-di-tert-butyl-9-fluorenyl) hafnium dimethyl.

6. The process of claim 2 wherein said hafnium compound is covalently bridged between the biscyclopentadienyl ligands with a substituted silicon atom.

7. The process of claim 6 wherein said substituted silicon is substituted with hydrocarbyl substituent groups having from one to twenty carbon atoms or wherein said substituents are covalently connected such as to form a cyclic substituent group.

8. The process of claim 1 wherein the aryl groups of said halogenated tetraaryl Group 13 anion comprise at least one fused polycyclic aromatic ring.

9. The process of claim 8 wherein the at least one fused polycyclic aromatic ring contains at least three fluorine substituents.

10. The process of claim 9 wherein said halogenated tetraaryl Group 13 anion is [tetrakis(perfluoronaphthyl) borate].

11. The process of claim 1 wherein the aryl groups of said halogenated tetraaryl Group 13 anion comprise at least one aromatic ring pendant in the 4 position to a phenyl ligand.

12. The process of claim 11 wherein said halogenated tetraaryl Group 13 anion is [tetrakis(perfluoro-4-biphenyl) borate].

13. The process of claim 8 wherein said cocatalyst precursor ionic compound comprises a cationic complex selected from anilinium, ammonium, carbenium and sylium cationic complexes.

14. The process of claim 10 wherein said cocatalyst precursor ionic compound comprises a cationic complex selected from anilinium, ammonium, carbenium and sylium cationic complexes.

15. The process of claim 11 wherein said cocatalyst precursor ionic compound comprises a cationic complex selected from anilinium, ammonium, carbenium and sylium cationic complexes.

16. The process of claim 12 wherein said cocatalyst precursor ionic compound comprises a cationic complex selected from anilinium, ammonium, carbenium and sylium cationic complexes.

17. The process of claim 1 wherein said homogeneous polymerization conditions are adiabatically conducted in a continuous polymerization process.

18. The process of claim 17 wherein the reaction temperature is in a range of 160° C. to 200° C.

19. The process of claim 18 wherein said homogeneous polymerization conditions are conducted in a continuous process at a pressure of at least 500 bar.

20. The process of claim 17 wherein said one or more comonomers capable of insertion polymerization are selected from the group consisting of 1-butene, 1-hexene, and 1-octene.

21. The process of claim 19 wherein said one or more comonomers capable of insertion polymerization are selected from the group consisting of 1-butene, 1-hexene, and 1-octene.

* * * * *